Figure 1:
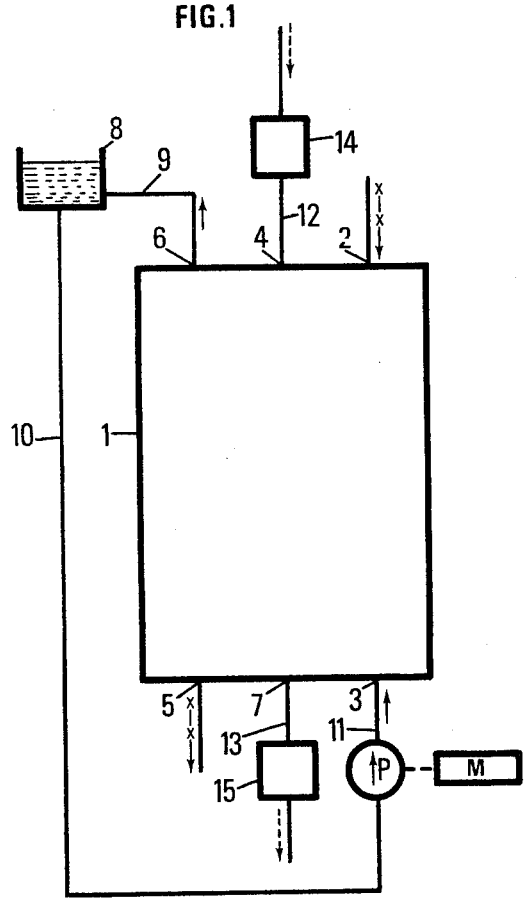

United States Patent [19]

Cheron

[11] 4,039,728

[45] Aug. 2, 1977

[54] AUTOMATIC DEVICE FOR OPENING AND CLOSING THE COMBURENT INLET AND OUTLET PORTS OF A FUEL CELL

[75] Inventor: Jacques Cheron, Maisons Lafitte, France

[73] Assignee: Institut Francais du Petrole, France

[21] Appl. No.: 614,940

[22] Filed: Sept. 19, 1975

[30] Foreign Application Priority Data

Aug. 10, 1974 France .................................. 74.34192

[51] Int. Cl.² .............................................. H01M 8/04
[52] U.S. Cl. ..................................................... 429/22
[58] Field of Search ................. 136/86 R, 86 E, 86 B, 136/86 C, 22; 429/22

[56] References Cited

U.S. PATENT DOCUMENTS

| 3,364,070 | 1/1968 | Alexander | 136/86 B |
| 3,525,641 | 8/1970 | Thorsheim | 136/86 B |
| 3,881,958 | 5/1975 | Carr et al. | 136/86 R |

*Primary Examiner*—John H. Mack
*Assistant Examiner*—H. A. Feeley
*Attorney, Agent, or Firm*—Craig & Antonelli

[57] ABSTRACT

An automatic device for a fuel cell including inlet and outlet ports connected to an electrolyte feeding circuit provided with a pump for electrolyte circulation and inlet and outlet ports for a comburent, this device comprising in combination obturation means for closing and opening said inlet and outlet ports for the comburent, and control means connected to said obturation means, said control means actuating said obturation means in response to a parameter which depends on the circulation of electrolyte through the fuel cell.

26 Claims, 6 Drawing Figures

AUTOMATIC DEVICE FOR OPENING AND CLOSING THE COMBURENT INLET AND OUTLET PORTS OF A FUEL CELL

The present invention relates to an automatic device for opening and closing the comburent inlet and outlet ports of a fuel cell.

When a fuel cell is out of operation, each of the chambers delimited by the electrodes (electrolyte chambers, comburent chambers and fuel chambers) is generally filled with at least one liquid or gaseous fluid at a determined pressure sufficient to prevent any deformation of the electrodes.

Electrolyte may be introduced into the fuel chambers or alternatively fuel may remain in these chambers, while most of the time the electrolyte chambers remain filled up with electrolyte. The comburent inlet and outlet ports are obturated through suitable devices, such as valves, while electrolyte may be introduced into the comburent chamber or an inert gas, such as nitrogen may be substituted for the comburent in these chambers.

To put again the fuel cell into operation, a series of operations must be performed in a well-defined order. In particular, comburent should be introduced into the fuel cell only after the latter has been supplied with electrolyte, i.e. when the electrolyte circulation through the fuel cell is effective.

The purpose of this invention is to simplify these operations, by providing an automatic device for opening and closing inlet and outlet ports for the comburent in a fuel cell.

More precisely, the device according to the invention provides for automatic opening or closure of the inlet and outlet ports for the comburent in a fuel cell, depending on whether the circulation of electrolyte through the fuel cell is effective or not.

Another advantage of the device according to the invention is to automatically provide for automatic closure of the inlet and outlet ports for the comburent during the periods of non-operation of the fuel cell, thus limiting the consumption of comburent corresponding to the phenomenon of electrolytic short-circuit within the fuel cell block.

Figure 2:
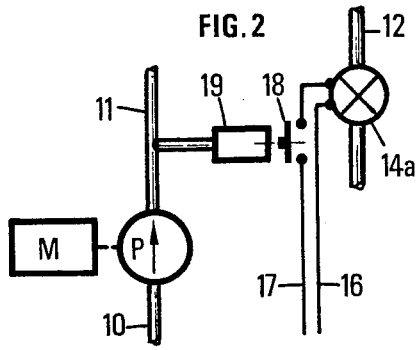
Figure 3:
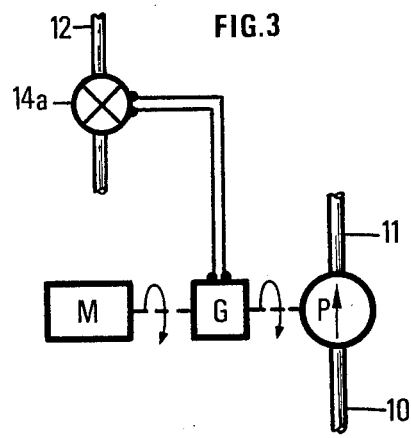
Figure 4:
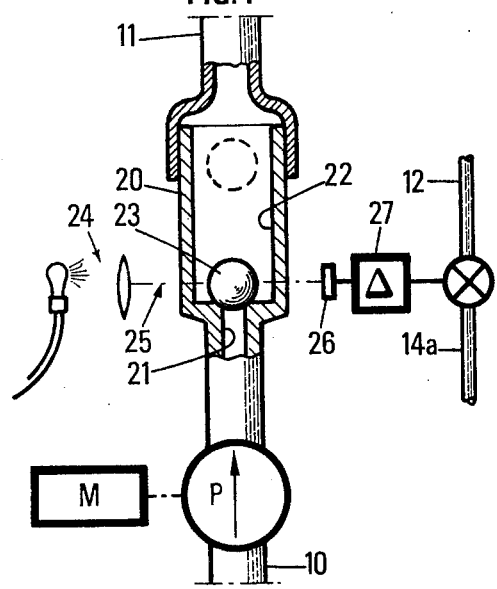
Figure 5:
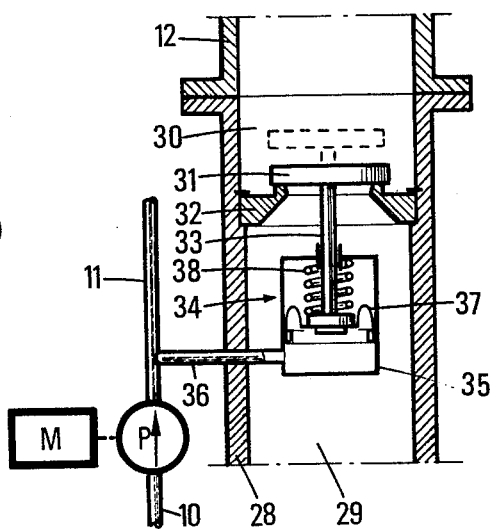
Figure 6:
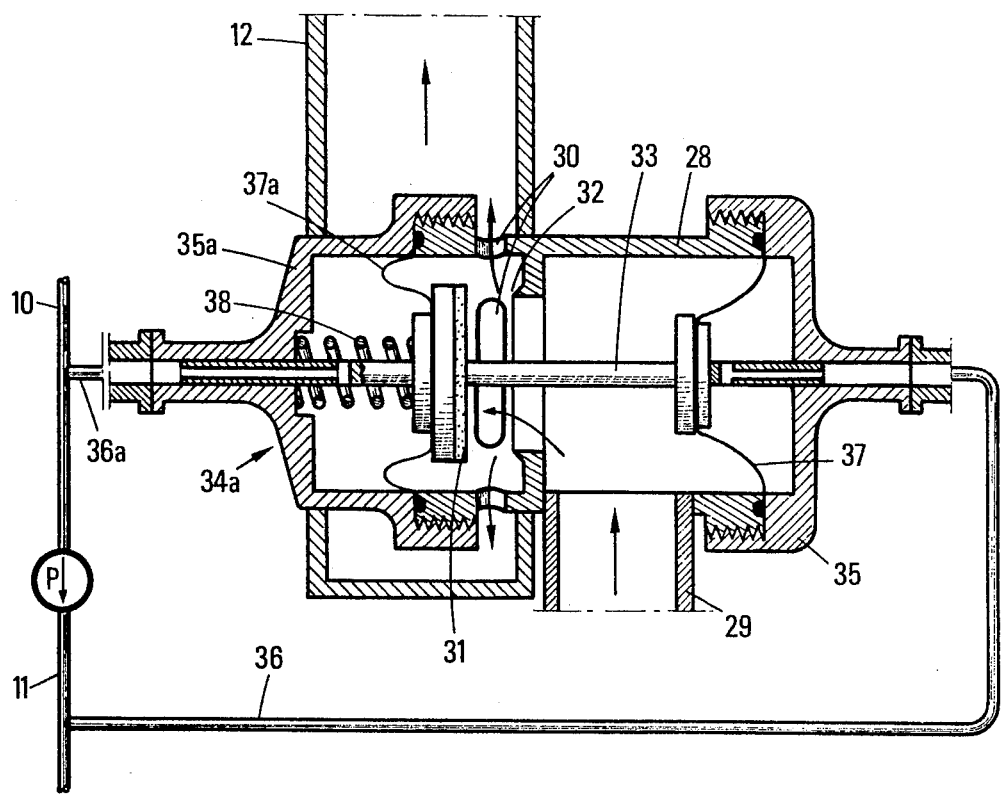

The invention will be understood and the advantages thereof made more readily apparent from the following description of non-limitative embodiments illustrated by the accompanying drawings wherein:

FIG. 1 diagrammatically illustrates a fuel cell whose inlet and outlet ports for the comburent are provided with obturating means, FIG. 2 diagrammatically shows a first embodiment of the automatic device according to the invention, FIG. 3 illustrates a second embodiment of the invention, FIG. 4 shows a third embodiment of the invention, FIG. 5 diagrammatically illustrates a fourth embodiment, and FIG. 6 illustrates a modification of the device shown by FIG. 5.

FIG. 1 diagrammatically illustrates an embodiment of a fuel cell comprising a fuel cell block generally indicated by reference numeral 1. As is well known to those skilled in the art, the fuel cell block 1 is made of a casing housing electrodes which delimit there between first chambers wherethrough flows a liquid electrolyte, such as potassium hydroxide KOH, second chambers supplied with fuel, such as gaseous hydrogen $H_2$ and third chambers receiving a comburent, or combustion-sustaining fluid, such as pure oxygen, or air.

The fuel cell block is provided with three inlet ports 2,3 and 4, which communicate respectively with the fuel chambers, the electrolyte chambers and the comburent chambers. The fuel cell block also comprises three outlet ports 5,6 and 7 communicating respectively with the fuel chambers, the electrolyte chambers and the comburent chambers.

The inlet port 2 and the outlet port 5 are connected to a circuit (not shown) supplying the cell block with fuel.

The inlet port 3 and outlet port 6 are connected to an electrolyte feeding circuit, this circuit comprising an electrolyte tank 8, a pipe 9 connecting tank 8 and inlet port 3, and a rotating pump P actuated by a motor M, the inlet and outlet openings of the pump P being respectively connected to pipes 10 and 11 for circulating the electrolyte in the direction indicated by the arrows in FIG. 1.

The inlet and outlet ports 4 and 7 are respectively connected to a comburent feeding pipe 12 and to a discharge pipe 13.

Each of pipes 12 and 13 comprises an obturation means (oburation means 14 and 15).

When starting the fuel cell the obturation means 14 and 15 must be open when the circulation of electrolyte in the fuel cell block 1 is effective and they must be closed in the absence of any electrolyte flow.

Through the device according to the invention, opening and closure of these obturation means is performed automatically, without requiring any particular intervention of an operator.

This device comprises, in combination means for obturation of the inlet and outlet ports for the comburent feeding the fuel cell block, control means adapted to actuate these obturation means when a parameter dependent on the electrolyte circulation through the fuel cell block reaches a determined value.

FIG. 2 diagrammatically illustrates a first embodiment of the invention, wherein the obturation means 14 and 15 are constituted by electrically controlled valves, such as valve 14a, supplied with electric current through conductors 16 and 17 and a switch 18.

In this embodiment, the control means consist of a pressure detector 19, detecting the excess of pressure above a preset pressure level, and connected with the pump outlet, in parallel with pipe 11.

This pressure detector is adapted to actuate the switch 18 in response to the value of the electrolyte pressure at the outlet of the pump, i.e. to the value of the electrolyte pressure upstream of the fuel cell block relatively to the direction of flow of the electrolyte.

The operation of the device is described hereinafter. The motor M being stopped, the pump P does not induce any electrolyte flow. The switch 18 is in the position shown in FIG. 2, wherein the electric circuit supplying the valve 14a is open. The valve 14a is then closed and the comburent cannot flow into the fuel cell block 1 through pipe 12.

When, in the course of the operations for actuating the fuel cell, the motor M is energized, it rotates the pump P and the electrolyte pressure at the outlet of the pump P increases. When this increasing pressure reaches the value $P_1$ for which the pressure detector 19 is calibrated and which corresponds to the desired effective flow of electrolyte through the fuel cell block 1, the pressure detector 19 actuates the switch 18, thereby closing the electric feeding circuit of valve 14a. The latter opens, thus supplying comburent to the suitable chambers of the fuel cell block.

When is the course of the operations performed for stopping the operation of the fuel cell, the motor M is no longer supplied with current, the pump P is no longer rotated and the pressure at the outlet of pump P decreases.

When this pressure reaches a value $P_2$ (which may or not be equal to $P_1$) this value being fixed for the pressure detector and corresponding to an important reduction in, or to a stopping of the effective flow of electrolyte through the fuel cell block 1, the pressure detector 19 actuates the switch 18 to open the electric feeding circuit of valve 14a. The latter is closed, thus stopping the comburent feed of the fuel cell block 1.

For sake of simplification it has been assumed that the device of the invention illustrated in FIG. 2 only provides for opening and closure of the comburent inlet port of comburent cell block 1, but it must be understood that a similar device is used for opening or closing the comburent outlet port be possible and preferable to use a single pressure detector adapted to control two switches, one of which forming a part of the electric feeding circuit of the valve which constitutes the obturation means for the comburent inlet of the fuel cell block, the other switch forming a part of the electric feeding circuit of the valve which constitutes the obturation means of the comburent outlet.

obturation is also possible, without departing from the scope of the present invention, to use other control means for actuating the valves which constitute the obturantion means for the fuel inlet and outlet ports.

One may, for example, use a tachometric generator G driven by the motor M, as illustrated by FIG. 3, or also mechanically connect the switches, such as switch 18, to another (not illustrated) switch which starts the motor M.

FIG. 4 illustrates another embodiment of the invention wherein the control means for the valves such as 14a, include flow measuring means, of the type known as "rotameter" or "gyrometer". This means, positioned between the outlet of the pump and the pipe 11, consists of a transparent tube 20, for example made of glass, whose lower part has a bore 21 of a diameter smaller than that of the bore 22 of the upper part of this tube. In the tube is located a ball 23 formed of an opaque material having a selected density and a diameter comprised between the diameter of bore 21 and that of bore 22. The control means also comprise a light-source 24 transmitting a light beam 25 which may pass through the glass tube 20 before reaching a photoelectric cell 26 located on the opposite side of the tube, facing the light-source 24. The cell 26 is connected to the inlet terminal of an amplifier 27 whose outlet terminal is connected to the electric valve 14a to be controlled.

When the electrolyte circulation is stopped the ball 23 has the position shown in solid line in FIG. 4, whereby this ball forms an obstacle to the propagation of the light beam. The cell 26 does not receive any light and the valve 14a is in its closed position.

When, under the action of pump P driven by the motor M, the electrolyte flows through the pipe 11 and consequently through the fuel cell block 1, the ball 23 moves upwardly to the position shown in dashed line in the drawing. The light ray 25 reaches the cell 26 which delivers a signal transmitted to the amplifier 26. The latter generates a control signal opening the valve 14a to permit comburent inlet into the fuel cell block 1.

When the circulation of electrolyte is stopped, the ball 23 falls back to its initial position, thus shutting out the light beam 25 and causing closure of the valve 14a.

A similar device can obviously be used to open and close the comburent outlet port but it will be preferable to make use of an amplifier capable of simultaneously controlling and actuating the two valves which control opening and closure of the comburent inlet and outlet ports.

FIG. 5 illustrates a preferred embodiment of the invention which has the advantage of requiring a practically negligible power to be operated.

This device comprises a body member 28 connected to pipe 12 through any suitable means, such as by a coupling. this body member, generally of cylindrical shape, has an inlet port 29 and an outlet port 30, the latter directly communicating with pipe 12. Inside the body 28 is housed an obturating member through which the port 29 can be put in communication with port 30.

This obturating member is constituted by a mobile valve 31 having a valve seat integral with the body 28. The valve 31 is provided with a control rod 33 actuated by an element which is designated as a whole by reference numeral 34. This element 34 is adapted to actuate the valve 31 in response to the value of a parameter which is a function of the electrolyte circulation through the fuel cell block.

In the embodiment illustrated by FIG. 5, this parameter is the electrolyte pressure at the outlet of pump P, i.e. the value of the electrolyte pressure upstream of the fuel cell block relatively to the direction of the electrolyte flow.

Element 34 is constituted by a pressure gauge 35 connected to the outlet of pump P through a pipe 36. This pressure gauge 35, whose volume varies as a function of the internal pressure, has a wall 37 which is deformable against the antagonistic action of elastic means 38, such as a spring. The free end of the control rod 33 for the valve 31 is integral with the deformable wall 37 of the pressure gauge 35.

The operation of this device is as follows. When pump P is stopped, the electrolyte does not flow through the fuel cell block 1. The force applied to the deformable wall 37 by the electrolyte is smaller than that applied by the spring 38, and the valve 31 is pressed against its seat 32 (position illustrated in solid line in FIG. 5). Any communication between the orifices 29 and 30 is thus discontinued.

When pump P is rotated by motor M, the electrolyte pressure in the pipe 11, and consequently inside the pressure gauge 35, increases. When this pressure reaches a determined value $P_1$, for which the spring 38 has been calibrated and which corresponds to an effective circulation of electrolyte through the fuel cell block 1, the valve 1 is opened (position illustrated in dotted line in FIG. 5) permitting the circulation of comburent through the fuel cell block.

Conversely, when the pressure of electrolyte decreases below a value $P_2$, which may or not be equal to $P_1$ and for which the flow of electrolyte is no longer effective, the action of the spring 38 on the wall 37 causes the closure of valve 31.

FIG. 6 illustrates a modification of the device diagrammatically illustrated by FIG. 5. As in FIG. 5, reference numeral 28 designates the body member of the device having an inlet opening 29 for the comburent and an outlet opening which, in this embodiment, is made of a plurality of orifices in the form of ports provided through the wall of body member 28 and opening directly into pipe 12. Reference numeral 31 designates the mobile valve and 32 the seat of this valve. The control rod 33 has one of its ends connected to the deformable membrane 37 of the pressure gauge 35, while its other end is connected to membrane 37a of a second pressure gauge 35a. The calibrated spring 38 applies to the valve a force directed to the right of FIG. 6.

The pressure gauge 35 communicates with the outlet of pump P through pipe 36, while pipe 36a connects the inlet of pump P with the pressure gauge 35a.

When the pump is in operation, the pressure at the inlet of this pump is transmitted to the pressure gauge 35a, while the pressure at the outlet of the pump is applied to the pressure gauge 35. Consequently the valve 31 is moved to the position shown in FIG. 6, against the antagonistic action of spring 38 and with a force whose value depends on the difference between the respective pressures prevailing at the inlet and the outlet of pump P. Comburent is admitted into the fuel cell block and flows along the path indicated by the arrows.

When the pump P is stopped, the pressure difference between the pump inlet and the pump outlet decreases and spring 38 presses the valve 31 against its seat 32, thereby interrupting the comburent inlet.

This embodiment of the device according to the invention provides for a faster and sharper control of the closure or opening of valve 31.

The outlet means for the comburent from the fuel cell block may obviously be identical to those illustrated in FIGS. 5 and 6.

Changes may be made without departing from the scope of the present invention. For example in the embodiment of FIG. 2, the pressure detector 19 can be directly connected to the inlet 3 of the fuel cell block. In the embodiments of FIGS. 5 and 6, the pipe 36 may also be connected to the inlet 3 of the fuel cell block, while pipe 36a (FIG. 6) will be connected to the outlet 6 of the fuel cell block 1.

Pistons may also be substituted for the membranes of the pressure gauges of FIGS. 5 and 6.

The valves which constitute the obturation means 14 and 15 of the comburent inlet and outlet ports may be made integral with one and the same control rod 33 (FIGS. 5 and 6).

Moreover the obturation means 14 and 15 may be given such a profile that during opening and closure of these means the inlet flow of comburent follows a continuous variation according to a preselected law.

For example, a conical valve may be used to provide an inlet flow of comburent substantially proportional to the electrolyte flow rate through the fuel cell block.

I claim:
1. An automatic control device in combination with a fuel cell, said fuel cell comprising a first inlet port and a first outlet port connected to an electrolyte feeding circuit including a pump for effecting electrolyte circulation in said fuel cell, and a second inlet port and a second outlet port for respectively introducing and discharging comburent to and from the fuel cell, independently of said electrolyte feeding circuit, and said device comprising obturation means for closing and opening said second inlet and second outlet ports for the comburent and control means connected to said obturation means, said control means being adapted to actuate said obturation means in response to a parameter which is a function of the circulation of electrolyte through the fuel cell whereby said second inlet port and said second outlet port are open during flow of electrolyte through said fuel cell and are closed during absence of flow of said electrolyte through said fuel cell.

2. A device according to claim 1, wherein said obturation means comprises at least one electrically actuated valve.

3. A device according to claim 2, wherein said control means comprise at least one generator of electric current connected to said at least one valve, said generator being coupled to said pump for electrolyte circulation, said pump being a rotating pump, said parameter which is a function of the electrolyte circulation being the rotational speed of the pump.

4. A device according to claim 2, wherein said control means comprise at least one flowmeter measuring the electrolyte flow through the electrolyte feeding circuit, said flowmeter being adapted to deliver a control signal actuating said at least one valve when the value of the flow of electrolyte exceeds a predetermined value, said parameter which is a function of the electrolyte circulation being the flow of electrolyte through the electrolyte feeding circuit of the fuel cell.

5. A device according to claim 4, wherein said flowmeter comprises a transparent vertical tube whose upper part has an internal diameter greater than that of its lower part, a ball of selected density and of a diameter intermediate the respective internal diameters of the upper and lower parts of said tube, a light source transmitting a light beam through the tube and located at such a level that, in the absence of any electrolyte flow, said ball shuts out the light beam passing through said tube, a photoelectric cell having a location symmetric to said light source with respect to said tube, said photoelectric cell delivering a signal at the reception of a light beam which has traversed said tube, and an amplifier having input terminals connected to said photoelectric cell and having output terminals connected to said at least one valve, said amplifier delivering a control signal opening said at least one valve in response to a signal delivered by said photoelectric cell.

6. A device according to claim 2, wherein said control means comprise at least one pressure detector placed on the electrolyte feeding circuit upstream of the first inlet port with respect to the direction of flow of this electrolyte, said pressure detector being adapted to actuate at least one switch connected in series in an electric circuit of said at least one valve, so as to close said electric circuit when the electrolyte pressure has reached a predetermined value, said parameter which is a function of the circulation of electrolyte being the pressure of the electrolyte upstream the first inlet port of the fuel cell.

7. A device according to claim 1, wherein said obturation means comprises at least one valve.

8. A device according to claim 7, wherein said control means comprise at least one control rod integral with said at least one valve and at least one first pressure gauge whose volume varies by the action of the pressure against an elastic repelling means, said first pressure gauge being connected to the electrolyte feeding circuit of the fuel cell upstream the first inlet port of the fuel cell with respect to the direction of flow of the electrolyte, said first pressure gauge causing, through its volume variations, a displacement of said control rod, said parameter which is a function of the circulation of electrolyte being the pressure of the electrolyte upstream said first inlet port of the electrolyte in the fuel cell.

9. A device according to claim 8, wherein said control means comprise a second pressure gauge whose volume varies by the action of the pressure against said elastic means, said second pressure gauge being in communication with the electrolyte feeding circuit of the fuel cell downstream the first outlet port with respect to the direction of flow of this electrolyte, said second pressure gauge being operatively associated to said first pressure gauge to displace said control rod, said parameter which is a function of the circulation of electrolyte being the difference between the respective values of the electrolyte pressure upstream the first inlet port and downstream the first outlet port.

10. A device according to claim 8, wherein said elastic repelling means is a calibrated spring.

11. A device according to claim 8, wherein said first pressure gauge comprises a flexible deformable wall connected to said control rod.

12. A device according to claim 8, wherein said first pressure gauge comprises a piston slidable in a cylinder, said piston being connected to said control rod.

13. A device according to claim 7, wherein said at least one valve has a profile which, during displacement thereof provides for a continuous variation of the comburent flow.

14. A device according to claim 13, wherein said at least one valve has a profile which, during displacement thereof, provides for a variation in the comburent flow.

15. A device according to claim 13, wherein said at least one valve is of conical shape.

16. A device according to claim 8, wherein said first pressure gauge is connected to the outlet orifice of the pump.

17. A device according to claim 9, wherein said first pressure gauge is connected to the outlet orifice of the pump and said second pressure gauge is connected to the inlet orifice of the pump.

18. A device according to claim 2, wherein said obturation means comprises a first valve connected to said second inlet port and a second valve connected to said second outlet port.

19. A device according to claim 7, wherein said obturation means comprises a first valve connected to said second inlet port and a second valve connected to said second outlet port.

20. In an apparatus comprising a fuel cell, recirculation means for recirculating electrolyte through said fuel cell, reactant supply means for supplying a reactant to said fuel cell and comburent supply means for feeding a comburent to said fuel cell through an inlet port and discharging said comburent from said fuel cell through an outlet port, said inlet port and outlet port being separate from said electrolyte recirculation means, the improvement for controlling the flow of said comburent through said fuel cell comprising obturation means for closing and opening said inlet and outlet ports, and control means connected to said obturation means, said control means adapted to actuate said obturation means in response to the recirculation of electrolyte through the fuel cell whereby said inlet port and said outlet port are open during recirculation of said electrolyte through said fuel cell and are closed in the absence of recirculation of said electrolyte through said fuel cell.

21. The apparatus of claim 20 wherein said control means is adapted to open said inlet and outlet ports when the electrolyte flow rate through said fuel cell increases to a first predetermined value, said control means being further adapted to close said inlet and outlet ports when the flow rate of electrolyte through said fuel cell decreases to a second predetermined value.

22. The apparatus of claim 21, wherein said recirculation means includes means defining an electrolyte recirculation flow path and pump means connected to said flow path for causing electrolyte to flow through said flow path and thereby recirculate through said fuel cell.

23. The apparatus of claim 22, wherein said control means is responsive to the pressure in said flow path downstream of said pump.

24. The apparatus of claim 23, wherein said control means is responsive to the pressure downstream of said pump and further to the pressure upstream of said pump.

25. The apparatus of claim 23, further comprising a motor for actuating said pump, said control means being responsive to the operation of said motor.

26. The apparatus of claim 22, further comprising a flow meter in said flow path for measuring the flow rate of electrolyte in said flow path, said control means being responsive to said flow meter.

* * * * *